(12) United States Patent
Harvey et al.

(10) Patent No.: US 6,665,116 B1
(45) Date of Patent: Dec. 16, 2003

(54) ACHROMATIC LENS FOR MILLIMETER-WAVE AND INFRARED BANDS

(75) Inventors: Robin J. Harvey, Newbury Park, CA (US); Franklin A Dolezal, Reseda, CA (US)

(73) Assignee: HRL Laboratories, LLC, Malibu, CA (US)

( * ) Notice: Subject to any disclaimer, the term of this patent is extended or adjusted under 35 U.S.C. 154(b) by 106 days.

(21) Appl. No.: 09/612,846

(22) Filed: Jul. 10, 2000

(51) Int. Cl.[7] ............................................... G02B 13/14
(52) U.S. Cl. ...................... 359/355; 359/350; 359/356; 359/361
(58) Field of Search ................................ 359/350, 355, 359/356, 361; 250/339.01

(56) References Cited

U.S. PATENT DOCUMENTS

| | | |
|---|---|---|
| 4,765,722 A | 8/1988 | Aono |
| 4,790,637 A | 12/1988 | Mercado et al. |
| 5,007,689 A | 4/1991 | Kelly et al. |
| 5,204,782 A | 4/1993 | Mercado et al. |
| 5,262,633 A | 11/1993 | Kasai et al. |
| 5,694,240 A | 12/1997 | Sternbergh |
| 5,751,473 A | 5/1998 | Runciman |
| 5,914,822 A | 6/1999 | Maruyama et al. |
| 6,423,969 B1 * | 7/2002 | Amon ..................... 250/339.1 |

* cited by examiner

Primary Examiner—John Juba
Assistant Examiner—Fayez Assaf
(74) Attorney, Agent, or Firm—Tope-McKay & Associates

(57) ABSTRACT

The present invention relates to a method for designing an achromatic lens and a lens according to the design. The invention provides a lens that makes use of the differences in the index of refraction of ZnSe and ZnS in the mm-wave and IR wavebands to minimize the differences in focal position between the two wavebands. This lens train can be used in conjunction with a dual-band focal plane array to simultaneously focus two wavebands on a common focal plane and thus provide for simultaneous imaging in both wavebands.

7 Claims, 8 Drawing Sheets

ACHROMATIC LENS FOR MILLIMETER-WAVE AND INFRARED BANDS

GOVERNMENT RIGHTS

At least a portion of the work related to the invention described herein was performed under government contract, specifically contract DAAB 07-97-2-J035: Bolometer Focal Plane Array for Passive Millimeter Wave Imaging. All rights possessed by the U.S. Government in this subject matter are governed by the terms of that contract.

FIELD OF THE INVENTION

The present invention generally relates to a dual waveband lens, and in particular, to such lens which simultaneously focuses MMW and IR energy in a single focal plane.

BACKGROUND

A variety of lens systems have been developed for use in receiving and focusing electromagnetic energy. Most such lens systems are designed for use within a single region of the electromagnetic spectrum, such as the infrared or visible region.

Lenses find application in most optical devices; one of their purposes is to focus waves of electromagnetic radiation at a uniform focal point. Lenses achieve this by altering the direction of the electromagnetic wave as it passes through the lens medium. Lenses do not alter frequency, but the velocities of wave components are altered. Velocity within a lens is directly proportion al to wave length, consequently the effective index of refraction may be said to vary as a function of wavelength. Since the difference in the indices of refraction is small within a waveband region, the indices of refraction may be neglected in situations where the wavelengths are substantially similar. However, in situations where the wavelengths of interest are disparate, the optics will generally not perform similarly in both of the wavebands. Optics configured to focus radiation from a first waveband in a focal plane generally will not be suitable for simultaneously focusing radiation from a distant, second waveband, in the same focal plane.

Some lens systems have been developed for use with more than one region of the electromagnetic spectrum. Multiple band-region lens systems find application in numerous military and industrial detection systems. Such systems are useful because they allow the user to select the waveband that results in optimal detection, tracking and accuracy. In general, millimeter waves are more effective than infrared over long distances and in adverse weather conditions. For instance, the mm-wave waveband provides superior image data in inclement weather. The mm-wave readily penetrates rain, fog, other inclement weather, and even some opaque solids. Consequently the mm-wave based sensor may provide superior data in both long range, and environmental penetration applications. Conversely, the infrared waveband provides superior resolution but does have the range or penetrating power of the mm-wave waveband. Thus for optimal resolution and range a system capable of detecting in both wavebands is desirable.

Existing systems for creating dual wave-band lenses have relied on various means of separating the waveband components and then processing the individual components. Such systems include placement of two detectors, wherein one is placed at the first focal length and wherein the second is placed at the second focal length. These systems provide a combination system that is useful for both energy bands but necessarily obscures a portion of one of the wavebands. Such image obstruction is undesirable. Alternatively, some systems use a beam splitter to divide the incoming energy into two components. Each component is subjected to a different focusing system. Once focused the two bands may be projected onto a single focal plane. These devices usually use the same energy collection aperture and then direct the different types of energy to separate and different sensing devices using complex optical arrangements. This approach suffers from difficult problems in combining the data from the separate sensors, a process known as data fusion. Additionally the beam splitter can result in appreciable signal loss. Only a fraction of the incident energy from each band component ever reaches the detector. In many applications such losses may not be desirable or even acceptable. Additionally, the complexity of such a system often renders the system both expensive and unwieldy.

A desirable solution to these problems would comprise a system wherein a single lens could simultaneously focus two or more different energy band-regions at the same focal point.

SUMMARY OF THE INVENTION

The present invention provides an apparatus, wherein a single lens, or aggregation of lenses in a substantially columnar sequence, simultaneously focuses two or more different energy band-regions in substantially the same focal plane. Wherein said apparatus includes a first element that is exposed to the incident dual waveband radiation, the first element is comprised of a first composition and has a finite thickness, a perimeter, a first index of refraction, and a first and second surface substantially perpendicular to said perimeter. The first surface has a first geometry, or surface shape, and the second surface has a second geometry, or surface shape. The second element is comprised of a second composition and has a thickness, a perimeter, a second, and usually different, index of refraction, and a first and second surface substantially perpendicular to said perimeter. The first surface has a third geometry and the second surface has a fourth geometry. The first and second elements are aligned such that the second surface of the first element and the first surface of the second element are in substantial conformity with each other and aligned in such a way that the perimeters essentially form a column.

Another embodiment of the present invention provides a method for fabricating a multi-element lens configured to simultaneously focus a plurality of wavebands in an approximately identical focal plane. This method comprises the steps of selecting a number of materials, usually two, if air-gaps are not counted, having unique indices of refraction and known refractive behavior for the plurality of wavebands. Knowing the refractive behavior is important in determining the transmission properties of a material. The next step is to configure the materials in the form of an apparatus. The shape of the apparatus may be predicted using successive approximation techniques to generate aspheric lens surfaces for ideal focii in one of the wavebands, and then confirm the solutions by ray tracing with Snell's law in both bands.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Figure 1:
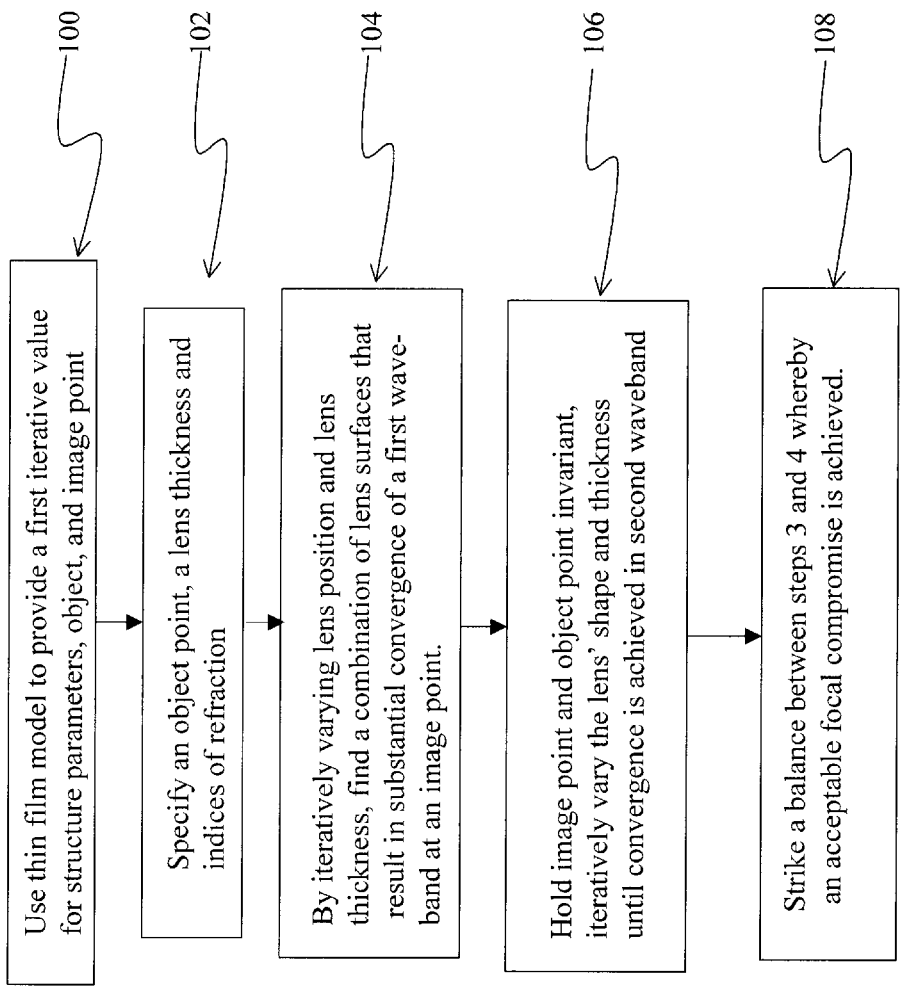
FIG. 1 shows a block diagram of one embodiment of the lens design protocol.

The present invention provides a method for designing an achromatic lens, and a lens according to that method, wherein said lens is suitable for simultaneous use in the mm-wave and infrared wavebands and may be tailored to a variety of other applications. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The optical properties of a lens are influenced by a combination of factors including the shape of the lens, the material properties inherent in the material from which the lens is fabricated, the aperture of the lens, and the electromagnetic waveband region where the lens will find application. In fabricating a lens all of the above parameters must be considered. For example, material suitable for one spectral region may not efficiently transmit the electromagnetic radiation from another region. Additionally, the shape of the lens' surface must conform to parameters dictated by the wavelength region where the lens will be employed. The present invention provides both a method for designing a dual wave-band lens and a lens according to the method.

A dual waveband lens, as the term is used here, is a lens that is capable of simultaneously focusing electromagnetic radiation, from two distinct and separate regions of the electromagnetic spectrum, in a single focal plane. The dual waveband performance characteristics are achieved by utilizing a plurality of different materials, wherein each material has refractive properties that are unique in each waveband. The lens' materials, surface shape, and aperture are all configured to simultaneously focus the electromagnetic radiation of a plurality of wavebands in substantially the same focal plane. A workable combination of such materials for application is the mm-wave and IR waveband regions include: Zinc Selenide (ZnSe) and Zinc Sulfide (ZnS). ZnS and ZnSe are well suited for a mm-wave and IR lens doublet because of their desirable material properties, and widespread utility, especially in infrared technology. Additionally ZnS and ZnSe both have good transmission properties in both mm-wave and IR bands. A lens doublet constructed utilizing layers of ZnSe and ZnS and having certain dimensional characteristics can substantially eliminate differences in focal position that normally result from the interaction between the electromagnetic radiation and the material properties of the lens components.

One embodiment of the present invention provides a method for designing an achromatic lens. The design method specifies a plurality of materials having unique indices of refraction. The method then advantageously makes use of the differences in the indices of refraction to minimize the differences in focal position in the two bands, thus simultaneously focusing the plurality of wave bands in a single focal plane, using a common aperture and lens train. The lens train resulting from this method can be used in conjunction with a dual-band focal plane array to simultaneously image in a plurality of wavebands. The following is an exemplary method of designing an achromatic lens, however this is only one method, other methods will be apparent to those skilled in the relevant art.

Designing the achromatic dual-waveband lens system according to the present invention is partially an iterative process and as such it is important to have reasonable starting values from which to begin the iteration process. The lens shape is selected based on aspheric lens surfaces for ideal foci in one band and then the solutions are confirmed by ray tracing in both bands, using Snell's law. If the two wavebands have substantially the same focal plane then the lens is considered acceptable. Certain tolerances may be programmed into the computing device. If the two wavebands do not have substantially the same focal plane the iterative process is repeated for another shape. In order to reduce the number of iterations, it is possible to search for solutions that would render equal focal lengths using thin lens formulae. Such a search could use the radius of curvature of the lens surfaces and their separations to determine the crossing points of the surfaces; and hence the first order aperture of the resulting system. This technique will yield a continuum of solutions.

Designing a thin lens having substantially identical focusing properties in the mmW and the IR wavebands may be achieved by iteratively varying a plurality of the lens' parameters and testing the resulting compound lens. One proposed lens design method is outlined in sequential step form in FIG. 1, however before starting the sequence the operator must select a plurality of appropriate lens materials. In making the selection the operator will find materials with unique indices of refraction, substantial transparency in both wavebands and sufficient durability to allow for utilization in the anticipated application. According to one embodiment of the present invention, the indices of refraction, are representative of those found in ZnSe and ZnS. However other materials having favorable transmission qualities in the mm-wave and IR band regions would be adequate as well. The first step 100 according to the sequence outlined by FIG. 1 calls for the use of a thin lens model to select a first iterative value for an image point. The second step, element 102 asks the operator to specify an object point, the lens' thickness and lens' indices of refraction. The third step 104 is optionally performed in a computing device, wherein the image point and lens' thicknesses are iteratively varied, to find a lens surface that results in substantial convergence of a first waveband at an image point. In the fourth step 106, the image point and object point are held invariant and the lens' shape and thickness are iteratively varied until convergence is achieved in a second waveband. Finally in the fifth step 108 the computing device or the operator will strike a balance between steps 3 and 4 whereby an acceptable focal compromise is achieved. By focal compromise one may assign lens system qualities such as; depth of field, field of view, or other related focusing requirements used by those skilled in the art.

The thin lens solutions may be obtained by fixing the object distance (U), the overall effective focal length (f) and the lens' material's indices of refraction (n1 and n2). An approximate scaling for a two-lens objective can be derived wherein the scaling relates the four radii of curvatures to the indices for a pair of closely spaced thin lenses as set forth in Eqn. 1.

$$\frac{(n_{12}-1)}{r_1} - \frac{(n_{12}-1)}{r_2} + \frac{(n_{34}-1)}{r_3} - \frac{(n_{34}-1)}{r_4} = \frac{1}{f} \qquad \text{Eqn. 1}$$

Where:

$n_{12}$ is the index of refraction for the first lens element
$n_{34}$ is the index of refraction for the second lens element
r is the respective lens' radius and
f is the overall focal length There are two thin lens equations, for each wavelength, relating the focal length to the four radii. Keeping the overall focal length fixed, yields a relationship between the interwaveband changes in refractive index given by Eqn. 2.

$$\Delta n_{12}\left(\frac{1}{r_1} - \frac{1}{r_2}\right) + \Delta n_{34}\left(\frac{1}{r_3} - \frac{1}{r_4}\right) = 0. \qquad \text{Eqn. 2}$$

Where:

$\Delta n12$ is n12(waveband 1)−n12(waveband 2)
$\Delta n34$ is n34(waveband 1)−n34(waveband 2)

These expressions may be rewritten in terms of the focal length f in a way that separates the requirements on curvatures of the two lenses in terms of numerical coefficients that depend solely on the lens' material indices of refraction.

$$f\left(\frac{1}{r_1}-\frac{1}{r_2}\right) = \left[\frac{+\Delta n_{34}}{\Delta n_{34}(n_{12}-1)-\Delta n_{12}(n_{34}-1)}\right] = \frac{+\Delta n_{34}}{a} \approx 2.69 \qquad \text{Eqn. 3}$$

$$f\left(\frac{1}{r_3}-\frac{1}{r_4}\right) = \left[\frac{-\Delta n_{12}}{\Delta n_{34}(n_{12}-1)-\Delta n_{12}(n_{34}-1)}\right] = \frac{-\Delta n_{12}}{a} \approx -2.33$$

Figure 2:
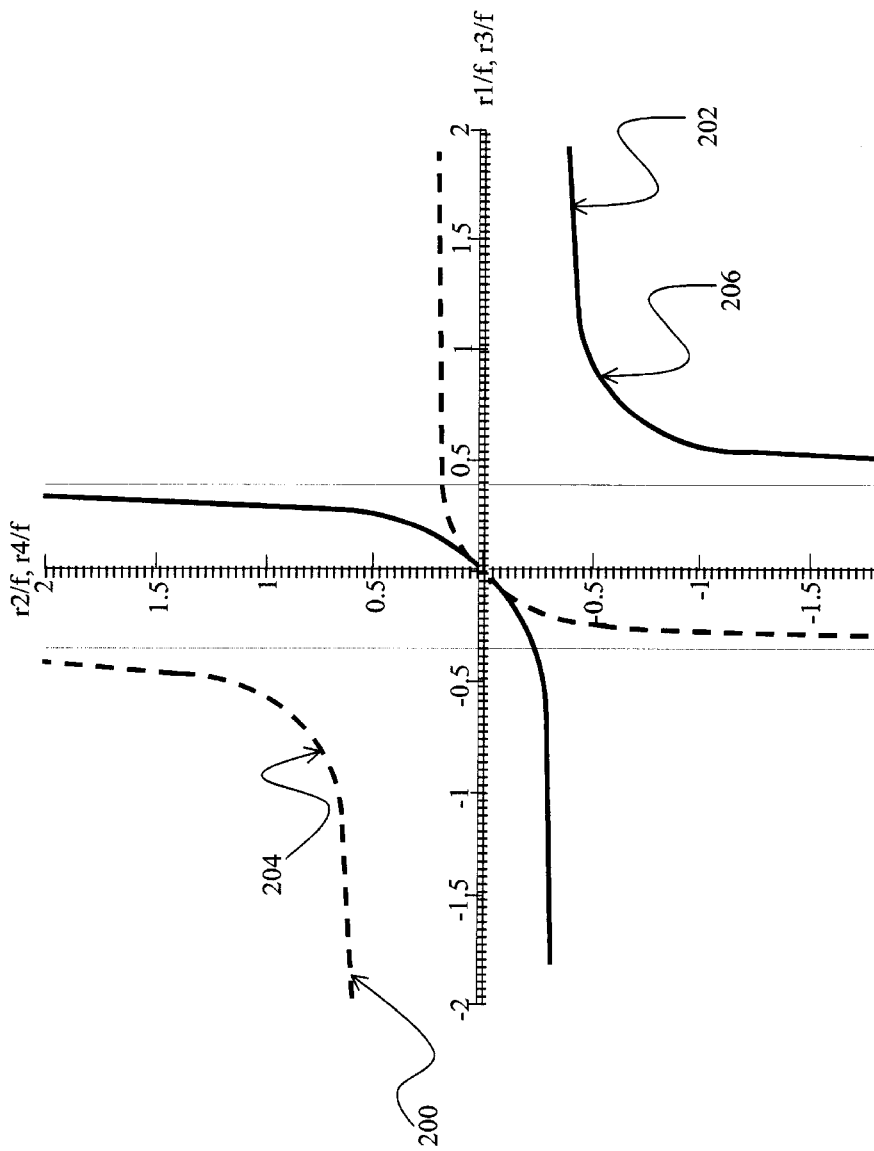
FIG. 2 is a graphical representation illustrating the relationship between the scaling of lens curvatures relative to focal length for a thin lens.

Where, a, is the numerator in the square brackets of equation 3. Numerically, the values within the square brackets have roughly the same amplitude, but their signs are opposite. Consequently, the first and second lenses must be of different character. The solutions for $r_2$ and $r_4$ in terms of focal length, and $r_1$ and $r_3$ in terms of focal length are given in FIG. 2. The solid curve 202 is for $r_2/f$ versus $r_1/f$ while the dashed curve 200 is for $r_4/f$ versus $r_3/f$. One example of a reasonable focal plane convergence occurs where $r_1/f=-r_2/f=0.74$, 204 and $r_3/f=-r_4/f=-0.86$, 206. By convention a negative radius for a second surface of a lens corresponds to a convex lens surface. This choice results in a doublet lens with a convex-convex lens followed by a concave-concave lens, which is satisfactory for many applications and avoids smaller radii and correspondingly smaller apertures.

The next step allows for the calculation of aperture based on the values ascertained for the lens radii. The aperture of a thin convex lens of thickness l, is given explicitly by:

$$h = \frac{1}{2}\sqrt{\frac{\text{lm}(2r_1-\text{lm})(2r_2-\text{lm})(2r_2-2r_1+\text{lm})}{(r_2-r_1+\text{lm})^2}} \qquad \text{Eqn. 4}$$

Where:
m=−1 for concave-convex lens or thin centered meniscus lens
m=+1 in all other cases
For small lens thickness l, and taking m=1, h becomes:

$$h = \sqrt{2}\sqrt{\frac{lr_1r_2}{-r_1+r_2}} \qquad \text{Eqn. 5}$$

solving for $r_2$:

$$r_2 = \frac{h^2 r_1}{h^2 - 2lr_1} \qquad \text{Eqn. 6}$$

inserting this value of $r_2$ into the left side of Eqn. 3, above, yields:

$$f\left(\frac{1}{r_3}-\frac{1}{r_2}\right) = \frac{2fl}{h^2} = 2.69 \qquad \text{Eqn. 7}$$

Solving for f, $$f = \frac{1.35h^2}{l} \qquad \text{Eqn. 8}$$

for the above example, $$r_1 = -r_2 \approx \frac{h^2}{l} \qquad \text{Eqn. 9}$$

Since the f-numbers f/2h, the effective f-number for the lens system will be $$f\text{-number} = \frac{f}{2h} = \frac{0.67h}{l} \qquad \text{Eqn. 10}$$

Combining Eqns. 8 and 10 yields:

$$f\text{-number} = 0.58\sqrt{\frac{f}{l}} \qquad \text{Eqn. 11}$$

For f/l ranging from 1 to 10, the f-number ranges from 0.58 to 1.82. In order to obtain convergence with thin lens systems, it is necessary to operate with relatively high f-number and longer focal length for the achromat. More than one such achromat may be used in combination to reduce the overall focal length and the lens system f-number.

A computing device may be used to search for improved solutions starting with an initial choice of equal focal lengths found using equation 8 of the thin lens formula. The computing device may use more general surfaces, not described by the radius of curvature for each of the lens surfaces. Along with variable thicknesses and lens separations to determine more optimal lens surfaces and hence improve upon the first order aperture and image quality of the resulting system.

When combined with conventional lens design principles, the off-axis focal properties near the focal points remain of good quality with minimal blurring. This invention employs, as shown below, a novel geometrical optics approach to lens surface design analysis wherein the surfaces are defined such that they ideally focus light from an object point to an image point.

Since the transform function used is ideal, an image point of one surface may be made the object point for the next surface. Thus the design of the surfaces may be chained together to produce a net image that focuses ideally from the original object to the final image. Taking the object and image points relative to the central surface point on a jth lens to be Uj and Vj, these two parameters, and the relevant indices of refraction, define the jth surface of the lens off axis.

The next step is to use the values obtained from the thin lens formulae as a starting point to design a thick lens. The f-number from Eqn. 11 provides a good initial value for the distance from the image point to the lens surface z, Eqn. 5 provides an initial value for h, the operator may specify object point U, and finally V may ascertained from the thin lens formula in the paraxial limit where r is the radius of curvature near the axis.

$$V = \frac{n_2 r U}{n_2 U - n_1 (r + U)}, \qquad \text{Eqn. 12}$$

Using the specified value of U, the thin lens derived estimated values for V, h, and z, it is possible solve for w=0 using Eqn. 13, where w is the deviation in optical path length.

$$w = n_1 \left( \frac{|U|}{U} \sqrt{(U + V - z)^2 + y^2} - U \right) + n_2 \left( \frac{|V|}{V} \sqrt{z^2 + y^2} - V \right) = 0 \qquad \text{Eqn. 13}$$

w-where w is the deviation in optical path length
y-radial distance from the axis to the lens surface
z-distance from the image point to the lens surface
U-object point on axis
V-image point on axis For an ideal focus, there should be no variation in optical path length, this allows for the calculation of the surface of y in terms of z. Using the lens surface produced from Eqn. 13 and using Snell's law, trace a ray's path for both wavebands, all such rays will necessarily converge. Next, a lens thickness is selected and Eqn. 13 is used to solve for the second lens surface, using new values for z, U, and V wherein the new values are based on the results obtained from the first iteration. The procedure is repeated for subsequent lens elements. Since the surfaces will not be spherical, testing for aperture and consistency of construction, and overlap of lens surfaces is conducted. The thickness and position of lens' surfaces to optimize aperture and f-number. Convergence will occur in substantially the original focal plane. However, the lens system will function as a dual waveband achromatic lens. If the thick lens system does not result in the convergence of the wavebands in substantially the same focal plane, then the process may either be repeated or additional lens elements may be added. Naturally, an excessive number of lens elements is undesirable.

The ray tracing is readily accomplished using the distance from the image point to the lens surface. Eqn. 13 can be solved explicitly for $h^2$ in terms of z. It can be shown by expansion that in the limit of paraxial rays (h<<V, z, U) that z has the same form as the thin lens equation $$\frac{n_1}{U} + \frac{n_2}{V} = \frac{n_2 - n_1}{r} \qquad \text{Eqn. 14}$$

where $r=(h^2/2)/(V-z)$ defines the sign of the curvature r, verifying that the expression is valid for at least paraxial rays.

Direct numerical solution of w=0 leads to a function for z[y] that may be used for plotting, machining of the surfaces, or for ray tracing. The function generally has four roots; of these two are imaginary, and one does not lead to z[0]=V. The remaining root is the desired surface. Direct application of Snell's law to the ray optics of lenses possessing the desired surface leads to convergence at the focal point. Accuracy of said convergence is subject only to numerical error arising from errors induced in the mathematical calculation.

A condition for convergence is that the given ray impinges the lens surface. Rays that do not impinge on the surface of the lens are not refracted and thus cannot be brought to a focal point. This represents a condition upon the aperture and speed of the lens. In order to determine the effective aperture, it may be noted that the expression for the surface may be simplified with the substitution $$h=\text{Sin}[\theta]R$$

$$z=\text{Cos}[\theta]R$$

where R is the root of the desired surface leading to:

$$\text{Cos}[\theta] = \frac{1}{2n_1^2(U+V)} \left( (n_1^2 - n_1^2)R + \frac{(n_1 - n_1)V(2n_1 U + n_1 V + n_2 v)}{R} + 2n^2(n_1 U + n_2 V)Sign[V] \right) \qquad \text{Eqn. 15}$$

The Cosine must be between −1 and 1; therefore, unless the coefficients of the powers of R involving U and V satisfy special requirements, the range of R is bounded. Functionally $$R = \frac{1}{2(n_1^2 - n_2^2)} \Big( 2n_1^2(U+V)\cos[t] - 2n_2(n_1 U + n_2 V)sign[V] \pm \sqrt{-4(n_1^2 - n_2^2)((n_1 - n_2)V(n_2 V + n_1(2U + V)) + (-2n_1^2(U+V)\cos[t] + 2n_2(n_1 U + n_2 V)sign[V])^2))} \Big) \qquad \text{Eqn. 16}$$

The correct root, depending upon $n_1$, $n_2$, U and V, occurs where $R[\theta=0] \rightarrow |V|$. As there is no pole, the surface will either enclose the point at V or the point at U.

Figure 3:
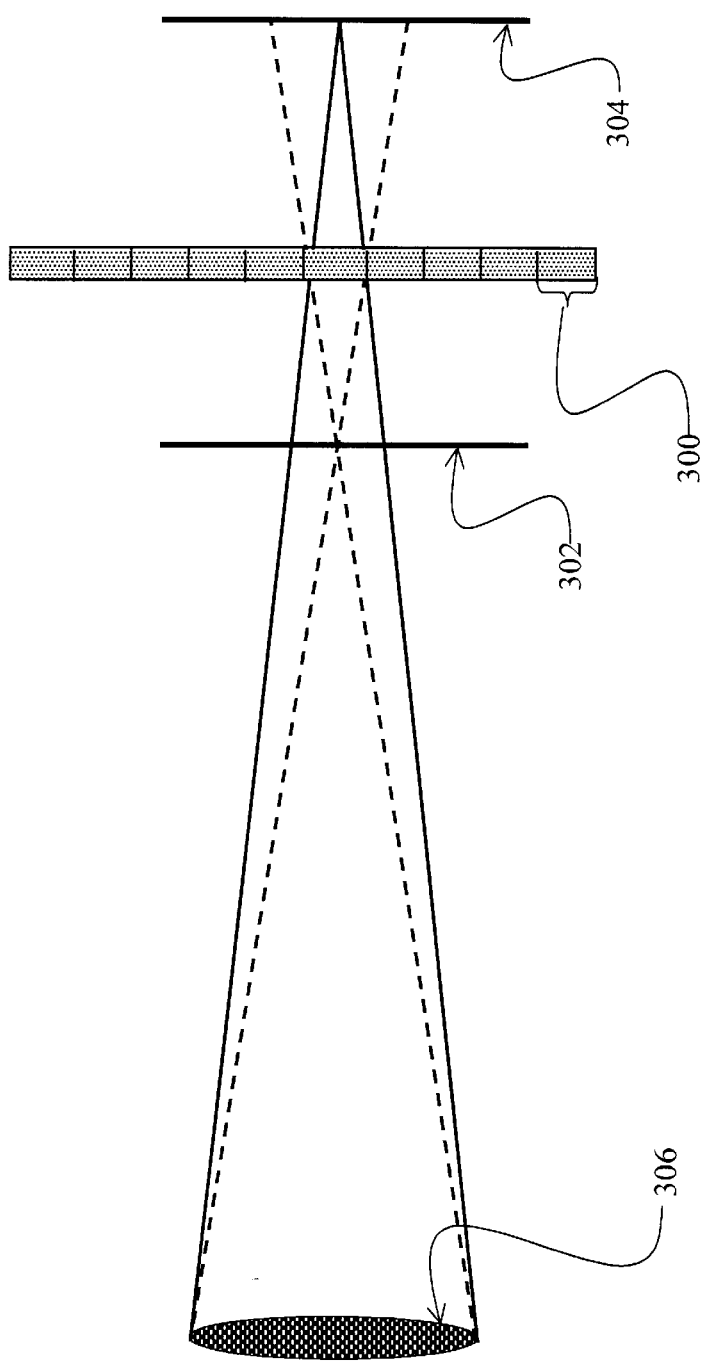
FIG. 3 shows how focal plane array pixel size and focal point convergence interrelate to provide resolution.

The present solutions are ideal in one band only. The image quality in the second band is good on axis, but somewhat degraded for non-paraxial rays. Since the IR band will be capable of a smaller pixel size, IR should be chosen as the first band. By reversing the order of the analysis one may find a complementary solution that idealizes the focus in the second band. It is possible to average between the resulting surfaces to find a surface that is a best compromise with minimum RMS distortion weighted by pixel size requirements. This is illustrated with greater clarity in FIG. 3. The incident rays only need to be focused to a resolution equal to the focal plane array pixel size. Element 300 represents the pixel size in a focal plane array and elements 302 and 304 represent the actual points of convergence and element 306 represents the lens. It should be noted that despite the disparity in focal points the image quality in both wavebands is comparable and is substantially at the resolving power of the focal plane array.

Figure 4A:
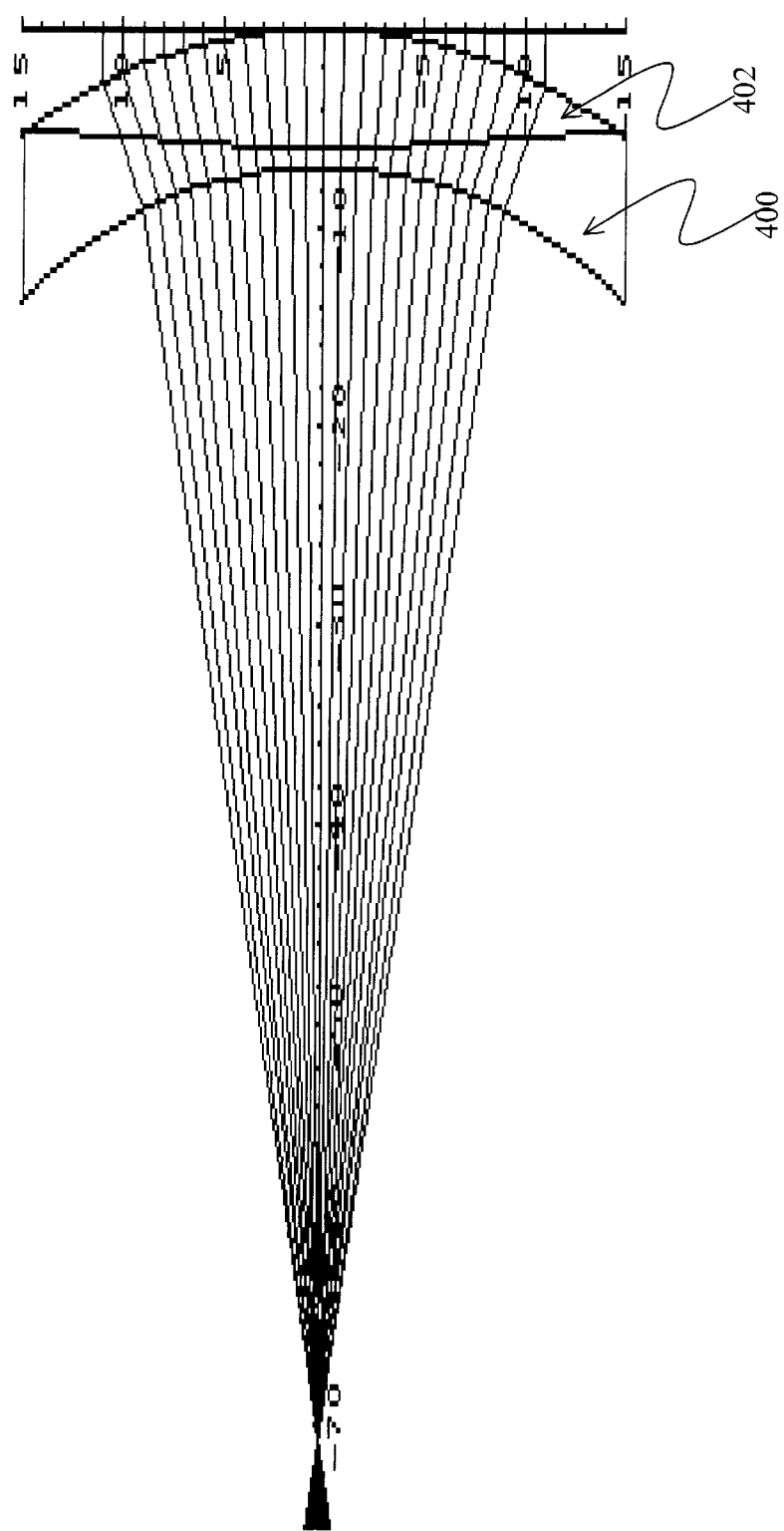
FIG. 4a provides an illustration of the design features of dual waveband lens, specifically as it performs in the IR waveband region.
Figure 4B:
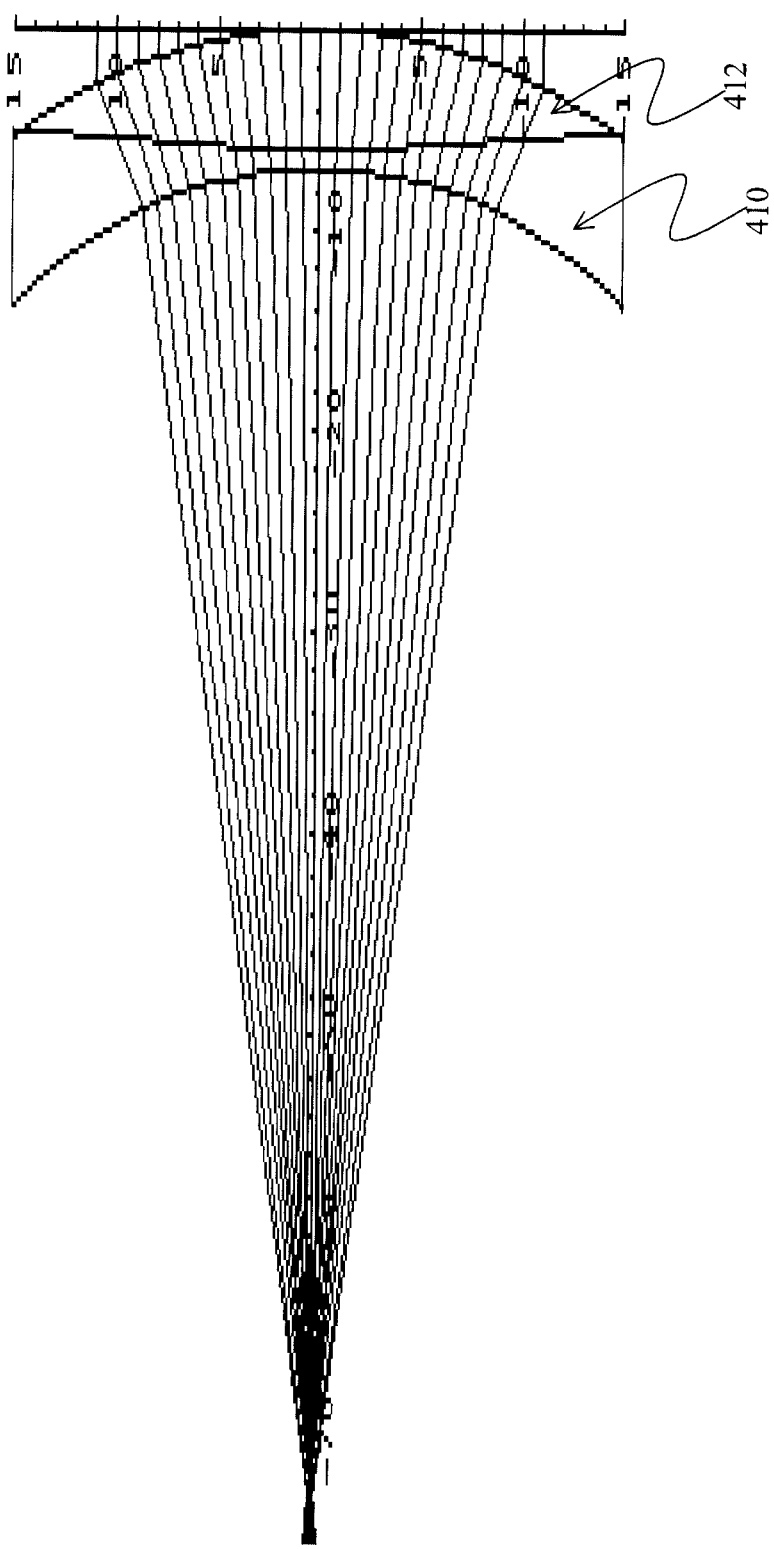
FIG. 4b is the same lens as that shown in FIG. 4a, the dual waveband lens, here shown performing in the mm-wave waveband.

The design features for a first objective lens doublet are presented in FIG. 4a for the IR waveband wherein the indices of refraction for lens components are $n_1$=2.433 and $n_2$=2.25. The lens itself is comprised of ZnS 400 and ZnSe, 402. The mm-wave behavioral characteristics in the mm-waveband are depicted in FIG. 4b. Wherein the same materials have indices of refraction of $n_1$=3.01 for the ZnS component 410, and $n_2$=2.897 for ZnSe component 412. These values as well as the lens shape data are provided in Table 1.

TABLE 1

Characteristic Lens Solutions Using Thin Lens Formula

| Feature | ZnS/ZnSe System | | ZnSe/ZnS System | |
| --- | --- | --- | --- | --- |
| | IR | mm-Wave | IR | mm-Wave |
| $U_1$, cm | 300-cm | 300 | 300 | 300 |
| $n_1$ | 1 | 1 | 1 | 1 |
| $r_1$, cm | −54 | −54 | 21.71 | 21.71 |
| $n_2$ | 2.25 | 2.90 | 2.433 | 3.01 |
| $f_1$, cm | −97.2 | −82.47 | 36.86 | 32.51 |
| $V_1$, cm | −84.97 | −75.32 | 38.82 | 33.73 |
| $U_2$, cm | 85.97 | 76.32 | −38.32 | −33.22 |
| $n_2$ | 2.25 | 2.897 | 2.433 | 3.01 |
| $r_2$, cm | 24 | 24 | −22 | −22 |
| $n_3$ | 2.433 | 3.01 | 2.25 | 2.897 |
| $f_2$, cm | 319.08 | 639.29 | 270.49 | 564.02 |
| $V_2$, cm | −131.17 | −90.52 | 31.33 | 30.26 |
| $U_3$ | 137.17 | 96.52 | −28.33 | −27.26 |
| $r_3$, cm | −42.9 | −42.9 | 24.09 | 24.09 |
| $n_4$ | 1 | 1 | 1 | 1 |
| $f_3$, cm | 29.94 | 21.34 | −19.27 | −12.70 |
| $V_3$, cm | 63.83 | 63.82 | 36.33 | 36.34 |
| $F_1$, cm | 70.83 | 70.82 | 39.83 | 39.84 |
| Thickness 1, cm | 1 | 1 | 0.5 | 0.5 |
| Thickness 2, cm | 6 | 6 | 3 | 3 |

FIG. 4a and FIG. 4b are scaled to show a compound achromat lens with a 30-cm aperture and a focal length of approximately 71-cm. The lens figure was generated by first generating aspheric lens surfaces for ideal focii in one band, and then confirming the solutions by ray tracing with Snell's law in both bands. The process is performed iteratively until a lens combination that has satisfactory convergence in both wavebands is obtained.

Figure 5:
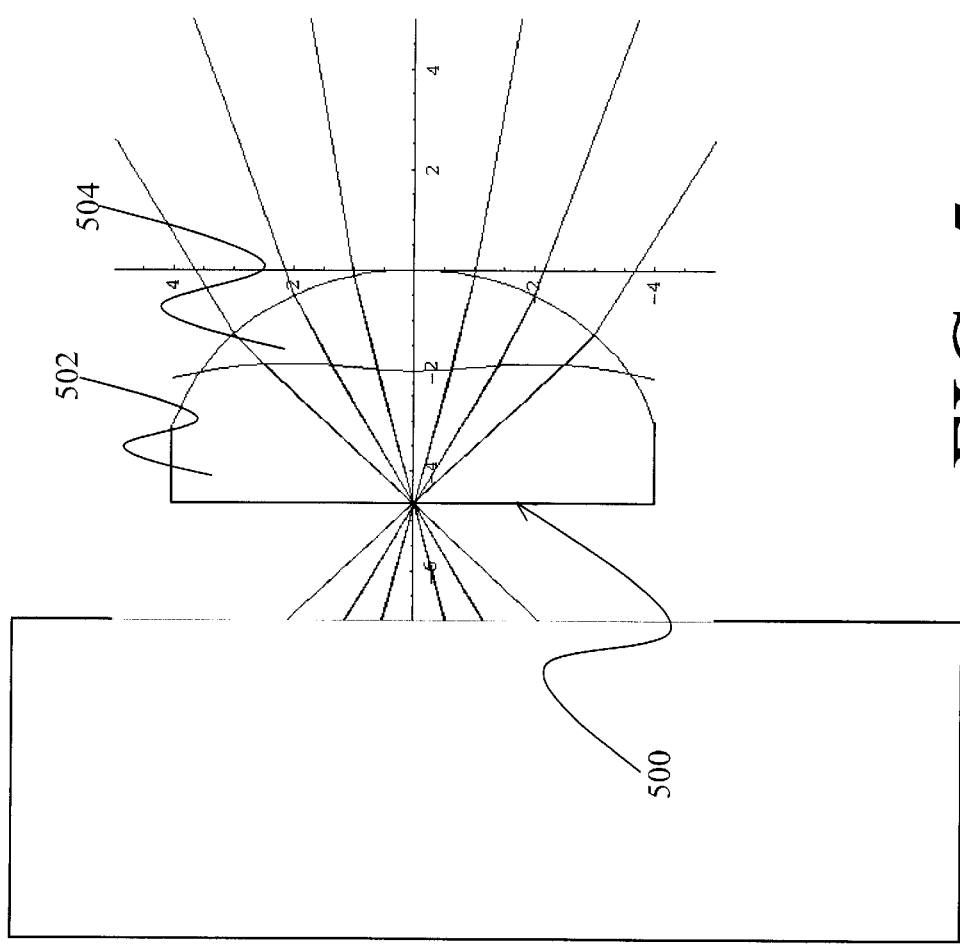
FIG. 5 shows an optional additional part that may be included in a lens train, specifically a second lens system is provided to further process electromagnetic radiation data, and provide improved focal convergence for a plurality of wavebands.
Figure 6:
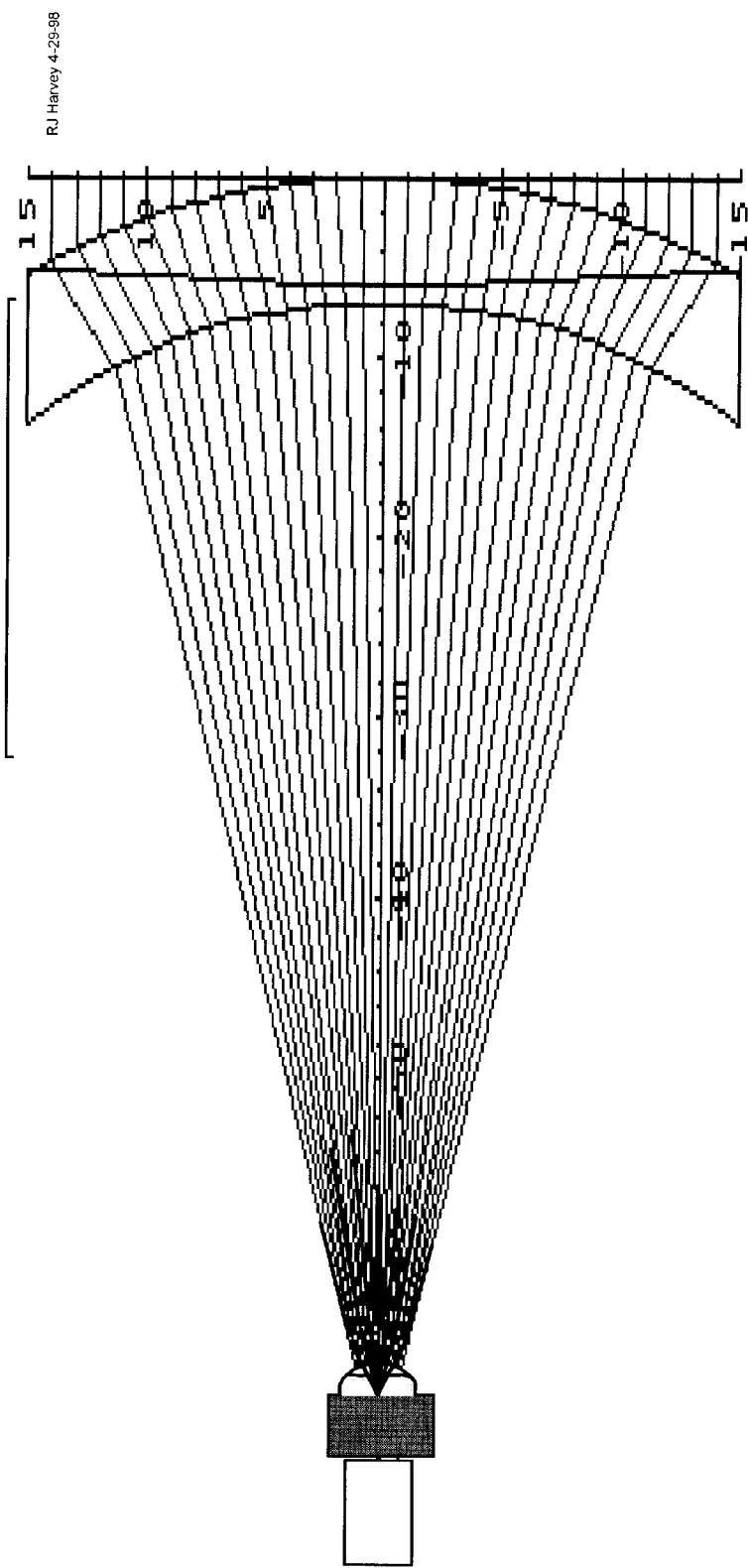
FIG. 6 is an aggregation of FIGS. 4a, 4b and 5, showing a fully integrated embodiment of the invention.

In situations where it is not possible to obtain sufficient convergence, a second or substrate lens, as shown in FIG. 5 may be added. When used in conjunction with the first lens doublet, the substrate lens 500 has good transmission properties and may be comprised of ZnS 502 and ZnSe 504. In the present embodiment the lens has a common focus for electromagnetic radiation at both 140 GHz and 10 microns. In addition to serving as an aid to convergence, the substrate lens finds application in situations requiring low f-number imaging; the substrate lens 500 can be employed as a means for reducing the f-number. The combination of FIG. 4a, FIG. 4b and FIG. 5 is shown in FIG. 6. The lens is configured for electromagnetic radiation in the IR and mm-wave and regions, specifically 10 micron and 140 GHz. The indices n1 and n2, listed Table 1, are representative of ZnSe and ZnS, but could be any other materials of showing promise in the mm-wave and IR bands. Notice that there is about a 4–8% difference between the zinc sulfide and zinc selenide materials, and a 24–29% change when the band is changed.

Figure 7:
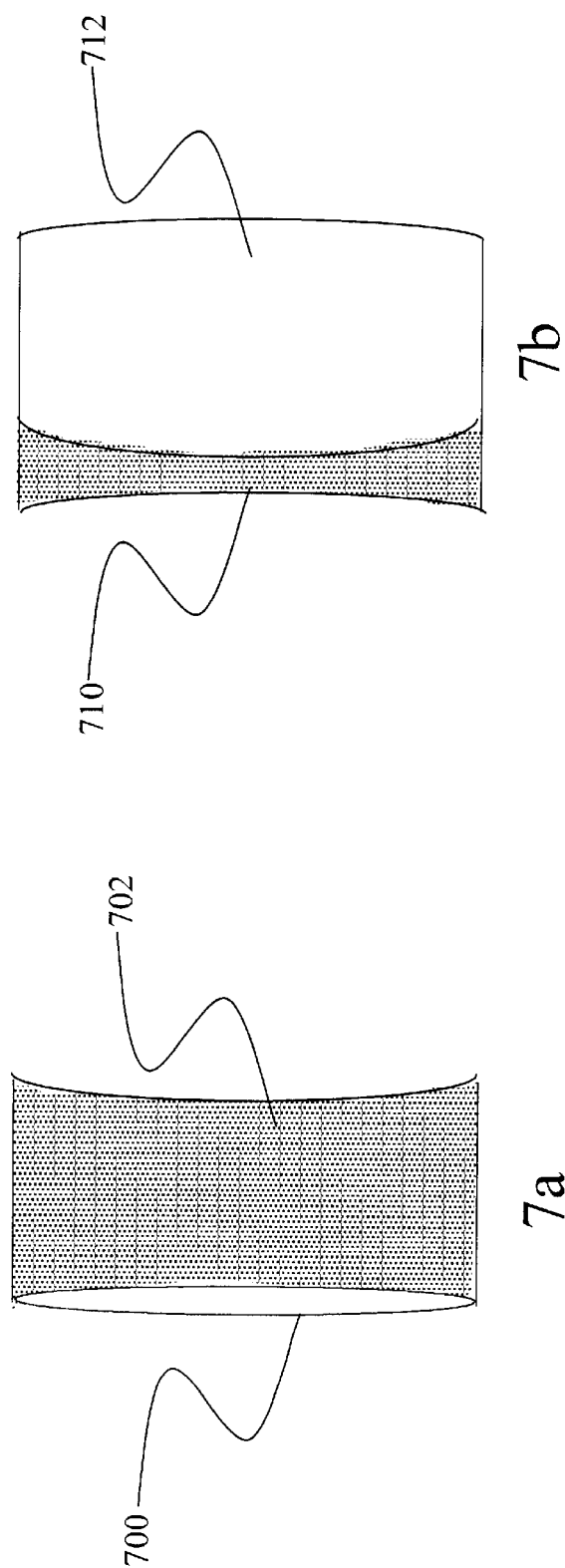
FIG. 7a shows a working embodiment of the present invention, in this case a ZnSe/ZnS lens.
FIG. 7b shows another working embodiment of the present invention, the obvious difference being that this embodiment shows a ZnS/ZnSe lens.

While the above description provides for a compound lens comprised of two lens elements having a common conformal boundary; it should be noted that it may be beneficial in terms of field of view and efficiency to introduce an air gap between the two lens elements, or to add a third lens component to symmetrize refraction or reduce the total lens thickness. Further, it is anticipated that-anti reflective coatings, or adhesives be introduced between the lens components. Additionally it may be practical to find lens solutions that simultaneously correct chromatic aberrations both in band and between bands by adding additional lens surfaces. However, these optional additions are not necessarily required to create an effective achromat. Never the less, an effective achromatic lens can be generated by considering only two lens elements having two of the surfaces joined at a common boundary. Two such characteristic lens designs are represented in Table 1 and illustrated in FIG. 7a and FIG. 7b. The ZnSe/ZnS system, shown in FIG. 7a is formed from a positive ZnS lens 700 followed by a negative ZnSe lens 702; while the ZnS/ZnSe system shown in FIG. 7b is formed from a negative ZnSe lens 710 followed by a positive ZnS lens 712. The design features described in Table 1 for the first objective lens doublet are shown in FIG. 7a. Said first objective is used as the electromagnetic radiation band receiver. The design features for the second objective lens doublet, described in Table 1 are shown in FIG. 7b. Each lens doublet element has an index of refraction. The indices of refraction, n1 and n2, are representative of ZnSe and ZnS respectively. However other materials having favorable optical qualities in the mm-wave and IR waveband regions would serve equally well. In the present case, there is roughly a 4–8% difference between the ZnS and ZnSe materials in a given waveband region and about a 24*14* 29% change when the waveband region is changed from IR to mmW.

What is claimed is:

1. An multi element apparatus capable of simultaneously focusing a plurality of wavebands in substantially the same focal plane, comprising:
   i. a first element comprising a first composition and having a thickness, a perimeter, a first index of refraction, and a first and second surface substantially perpendicular to said perimeter wherein said first surface has a first geometry and wherein said second surface has a second geometry;
   ii. a second element comprising a second composition and having a thickness, a perimeter, a second index of refraction, and a first and second surface substantially perpendicular to said perimeter wherein said first surface has a third geometry and wherein said second surface has a fourth geometry; and
   iii. said first and second elements are aligned such that the second surface of the first element and the first surface of the second element are in substantial conformity with each other and aligned such that the perimeters essentially form a column, wherein the plurality of wavebands include millimeter wave radiation and infrared radiation, wherein:
  i. millimeter wave radiation is between 30 GHz and 300 GHz; and
  ii. infrared radiation is between 0.75 and 750 micrometers.

2. A multi element apparatus as set forth in claim 1, wherein:
  i. said first element consists essentially of zinc sulfide;
  ii. said second element consists essentially of zinc selenide; and the second geometry of the first element and the third geometry of the second element form an interface.

3. A multi element apparatus as set forth in claim 1, wherein:
  i. said first element consists essentially of zinc selenide;
  ii. said second element consists essentially of zinc sulfide; and the second surface geometry of the first element and the first surface geometry of the second element form an interface.

4. A multi element apparatus as set forth in claim 1, wherein the second surface geometry of the first element and the third surface geometry of the second element are spaced a variable distance apart, wherein said distance is selected to optimize the multiple waveband focusing properties of the apparatus.

5. A multi element apparatus as set forth in claim 1, wherein the apparatus possesses a 30-cm aperture and approximately a 71-cm focal length in both bands.

6. A multi element apparatus as set forth in claim 1, wherein said apparatus comprises:
  i. a first element consisting essentially of Zinc Selenide and having an index of refraction of approximately 2.43 of millimeter wave radiation and approximately 3.01 for infrared radiation;
  ii. a second element having an index of refraction of approximately 2.25 for millimeter wave radiation and approximately 2.90 for infrared radiation; and
  iii. wherein the second surface geometry of the first element and the first surface geometry of the second element possess substantially identical but inverted geometries and conform with each other to produce an interface between said second surface geometry o the first element and the third surface geometry of the second element and
  iv. wherein the first element has an aperture of about 30-cm and a focal length of about 71-cm focal length for both millimeter wave and infrared radiation.

7. A multi element lens capable of simultaneously focusing on a plurality of wavebands in substantially the same focal plane, comprising:
  i. a first element comprising a first composition and having a first thickness, a first perimeter, a first index of refraction unique to the waveband passing though the element, and a first and second surface substantially perpendicular to said perimeter wherein said first surface has a first radius and wherein said second surface has a second radius;
  ii. a second element comprising a second composition and having a second thickness, a second perimeter, a second index of refraction unique to the waveband passing though the element, and a first and second surface substantially perpendicular to said perimeter wherein said first surface has a third radius and wherein said second surface has a fourth radius; and
  iii. said first and second elements are aligned such that the second surface of the first element and the first surface of the second element are in substantial conformity with each other and aligned such that the perimeters essentially form a column; and wherein
    a. said first radius is a negative 54 cm;
    b. said second radius is a positive 24 cm;
    c. said third radius is a negative 42.9 cm;
    d. said fourth radius is a positive 29.94 cm;
    e. said first index of refraction is 2.3 for infrared radiation and 2.9 in for mm-wave radiation;
    f. said second index of refraction is 2.4 for infrared radiation and 3.0 for mm-wave radiation.

* * * * *

UNITED STATES PATENT AND TRADEMARK OFFICE
CERTIFICATE OF CORRECTION

PATENT NO.         : 6,665,116 B1                                     Page 1 of 1
APPLICATION NO.    : 09/612846
DATED              : December 16, 2003
INVENTOR(S)        : Robin J. Harvey and Franklin A. Dolezal It is certified that error appears in the above-identified patent and that said Letters Patent is hereby corrected as shown below:

Column 6, line 5 Formula 4, that portion of the formula reading "$(2r_2-lm)$" should read --$(2r_2+lm)$--.

Column 10, line 46, cancel the text "24*14* 29%" and insert the text --24-29%--

Signed and Sealed this

Twenty-second Day of January, 2008

JON W. DUDAS
*Director of the United States Patent and Trademark Office*